United States Patent [19]

DeFranco et al.

[11] Patent Number: 5,759,472
[45] Date of Patent: Jun. 2, 1998

[54] LIQUID COLOR SYSTEM FOR USE IN ROTATIONAL MOLDING AND METHOD OF USING THE SAME

[75] Inventors: Paul J. DeFranco, Twinsburg; Robert J. Opalko, Middleburg Heights, both of Ohio

[73] Assignee: Ferro Corporation, Cleveland, Ohio

[21] Appl. No.: 684,437

[22] Filed: Jul. 17, 1996

[51] Int. Cl.⁶ .................................................. B29C 41/04
[52] U.S. Cl. .......................... 264/310; 264/311; 106/499; 106/504
[58] Field of Search .................. 264/310, 311; 106/499, 504

[56] References Cited

U.S. PATENT DOCUMENTS

| | | | |
|---|---|---|---|
| 3,966,488 | 6/1976 | Langenfelder | 106/499 |
| 4,587,318 | 5/1986 | Inoue et al. | 526/282 |
| 4,668,461 | 5/1987 | Needham | 264/310 |
| 4,738,815 | 4/1988 | Friesen | 264/310 |
| 4,909,852 | 3/1990 | Atkinson | 106/504 |
| 5,157,067 | 10/1992 | Burditt et al. | 524/270 |

FOREIGN PATENT DOCUMENTS 46-40111  11/1971  Japan ................................ 264/310

Primary Examiner—James Derrington
Attorney, Agent, or Firm—Rankin, Hill, Porter & Clark LLP

[57] ABSTRACT

The present invention provides a new and improved liquid color system for use in rotational molding. The liquid color system includes from about 10% to about 75% by weight carrier, from about 0% to about 15% by weight water, from about 0.01% to about 10% by weight dispersant and from about 10% to about 80% by weight colorant. The carrier comprises a material selected from the group consisting of propylene glycol, ethylene glycol, diethylene glycol, tri (ethylene glycol), glycerin and mixtures of such materials. The liquid color system displays an evaporation rate of from about 0.01 to about 0.36 pursuant to the test procedures of ASTM D3539-87. The invention also provides a method of using the liquid color system which includes the step of mixing the liquid color system with the polymeric resin powder using a distributive mixer prior to rotational molding.

12 Claims, No Drawings

LIQUID COLOR SYSTEM FOR USE IN ROTATIONAL MOLDING AND METHOD OF USING THE SAME

FIELD OF THE INVENTION

The present invention concerns a liquid colorant. More particularly, the invention concerns a liquid colorant for use in rotational molding and a method for use of such liquid colorant.

BACKGROUND OF THE INVENTION

Rotational molding is used for the production of hollow containers and other products of larger size and complicated structure which cannot be readily molded by other conventional molding techniques such as injection molding and sheet thermoforming. Such structures include, for example, gasoline tanks, casks, storage tanks and toys.

Rotational molding includes the steps of feeding a polymeric resin powder to a mold, heating the mold from the exterior while rotating the mold and melting the powder, thereby forming a molten synthetic resin layer within the mold, then cooling the mold to solidify the polymeric resin, and finally separating the mold from the molded product.

An example of a prior art machine for performing rotational molding may be found in Friesen U.S. Pat. No. 4,738,815. An example of a prior art polymeric resin powder for use in rotational molding may be found in Inoue et al. U.S. Pat. No. 4,587,318.

As discussed in the Inoue et al. '318 patent, the polymeric resin powder may be mixed with pigments so as to impart a color to the molded product. These pigments are added to the polymeric resin powder in the form of a dry powder or solids. Unfortunately, these pigment powders can present handling and mixing problems. Specifically, such pigments can form undesirable dust or they can mix unevenly with the polymeric resins.

Heretofore, attempts have been made to use conventional liquid color systems in rotational molding. However, such conventional systems did not fair well. Specifically, such systems did not mix well with the polymeric resin powders. This caused several problems. First, the liquid systems exude from the part as the resin powder fuses to form the part wall, forming tacky films on the part surfaces. Second, the colorants contained in the liquid systems can exude themselves from the carrier, thereby reducing the effectiveness of the colorants because they are not uniformly distributed.

SUMMARY OF INVENTION

The invention provides a new and improved liquid colorant or liquid color system that is designed specifically for use in rotational molding. The liquid color system mixes uniformly with the polymeric powder resin being utilized and it does not form lumps or other unwanted agglomerates. Also, the liquid color system of the present invention does not produce any exudation of colorants or carrier nor does it produce any undesirable volatile vapors during the rotational molding operation. The present invention also provides a method of rotational molding using a liquid color system.

In a preferred embodiment the liquid color system comprises from about 10% to about 75% by weight carrier, from about 0% to about 15% by weight water, from about 0.01% to about 10% by weight dispersant and from about 10% to about 80% by weight colorant, wherein said carrier comprises a material selected from the group consisting of propylene glycol, ethylene glycol, diethylene glycol, tri (ethylene glycol), glycerin and mixtures of two or more thereof.

The invention also provides a unique method of using the present liquid color system. This method includes the step of mixing the liquid color system in a distributive mixer along with the polymeric resin powder that is intended to be rotationally molded. The mixture of the polymeric resin powder and liquid color system can then be processed in a rotational molding machine. Specifically, the mixture is fed to a heated rotating mold, the mixture forming a colored molten resin layer within the mold which upon cooling solidifies and upon separating from the mold yields a colored molded product.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

The liquid color system of the present invention comprises a carrier, water, a dispersant and a colorant. The liquid color system of the present invention is specifically made for use in rotational molding and it provides several distinct advantages. Specifically, the liquid color system of the present invention can be uniformly mixed with the polymeric resin powder that is being used without the formation of agglomerates or other undesirable lumps. Also, the liquid color system of the present invention can be used without the formation of undesirable exudates or films on the surfaces of the parts formed thereby facilitating the easy release of the formed part from the mold.

The carrier comprises a material selected from the group consisting of propylene glycol, ethylene glycol, diethylene glycol, tri(ethylene glycol), glycerin and mixtures of two or more of these materials. A preferred carrier is propylene glycol. The propylene glycol that is employed is preferably a food grade product. An example of such a product is propylene glycol sold by the Avatar Corporation.

The dispersant that is utilized in the liquid color system is dependent upon the type of colorant and carrier being used. The dispersant is soluble in the carrier and it associates strongly with the particles of colorant as they are separated from each other during mixing, thereby preventing the particles from reattaching to each other during storage and use. Examples of suitable dispersants include polyvinylpyrrolidone (e.g., Sokalan HP50 from BASF), sodium salt of polyacrylic acid (molar mass from 1,200–250,000), sodium/iron salt of lignosulfonic acid, sodium salt of condensed naphthalenesulfonic acid, sodium naphthalene sulfonate and sodium salt of polymeric carboxylic acid.

Various colorants may be utilized in connection with the liquid color system. The term "colorant" when used herein denotes any conventional inorganic or organic pigment, organic dyestuff or carbon black. Those skilled in the art will be aware of suitable inorganic pigments, organic pigments and dyestuffs useful in component (II). Such materials are described, for example, in *Kirk-Othmer Encyclopedia of Chemical Technology*, Third Edition, Vol. 6, pages 597–617, which is incorporated by reference herein; examples are:

(1) inorganic types such as titanium dioxide, carbon black, iron oxide, zinc chromate, cadmium sulfides, chromium oxides, sodium aluminum silicate complexes, such as ultramarine pigments, metal flakes and the like; and (2) organic types such as azo and diazo pigments, phthalocyanines, quinacridone pigments, perylene pigments, isoindolinone, anthraquinones, thioindigo, solvent dyes and the like.

Preferably, the water that is employed in the liquid color system is a deionized water.

Various conventional additives or mixtures thereof may also be included in the liquid color system such as, for example, lubricants, antistats, impact modifiers, antimicrobials, light stabilizers, filler/reinforcing materials (e.g., $CaCO_3$), heat stabilizers, release agents, rheological control agents such as clay, etc.

Below is a table setting forth various ranges for the components used in the liquid color system of the present invention.

| Component | % By Weight | (Preferred) |
| --- | --- | --- |
| Carrier | 10–75 | 15–65 |
| Dispersant | .01–10 | .02–8 |
| Water | 0–15 | 1–14 |
| Colorant | 10–80 | 15–75 |
| Additives | 0–10 | 0–8 |

No matter what the exact composition of the carrier utilized, the liquid color system displays an evaporation rate of from about 0.01 to about 0.36, and preferably a rate of 0.015 to about 0.20. The evaporation rate has been found to be a critical factor in providing a suitable liquid color system for use in rotational molding. Evaporation rate is determined by using the test procedure set forth in ASTM D3539-87 (Reapproved 1992) using an automatic evaporometer whereby the relative evaporation rate for n-butyl acetate= 1.0.

It will be appreciated that the liquid color system of the present invention may be used in conjunction with various polymeric resin powders. Such powders include, for example, polymers and copolymers of olefins such as polypropylene, EVA and polyethylene materials such as LDPE, HDPE and LLDPE and engineered resins such as ABS, PPO and polyamides like Nylon, Nylon 66, Nylon 11 or Nylon 12, and mixtures of any of the foregoing.

The liquid color system of the present invention is preferably mixed with the polymeric resin powder using a distributive mixer. This differs from prior art methods where dry or powdered colorants or pigments are mixed with the polymeric resin powder using a rotating drum. Examples of suitable distributive mixers include Henschel mixers (horizontal or vertical), ribbon blenders, paddle blenders and rotary blade mixers such as high intensity continuous blenders manufactured by Munson Machinery, Inc. of Utica, New York. Depending upon the color requirements of the end product, the mixture of polymeric resin powder and liquid color system comprises from about 0.05% to about 4% by weight liquid color system.

The liquid color system of the present invention may be used in any conventional rotational molding machine to produce parts of various configurations. The method of using the liquid color system of the present invention includes the steps of mixing the liquid color system in a distributive mixer along with the polymeric resin powder that is to be molded, feeding the mixture into a rotating mold heated to a temperature of from about 350° F. to about 650° F., allowing the polymeric resin powder to solidify and form a part, and removing the formed part from the mold.

EXAMPLES

The present invention will be more fully understood from the following illustrative examples wherein all quantities, percentages and ratios are on a weight basis unless otherwise indicated. The following examples show the preparation of various liquid color systems in accordance with the present invention.

Example I

| Components | % By Weight |
| --- | --- |
| Sodium salt of polyacrylic acid (BASF Sokalan PA-15) | 0.50 |
| Propylene glycol (Avatar Corporation) | 26.37 |
| Distilled water | 2.93 |
| Titanium dioxide (Tioxide TR-92) | 70.00 |
| Bentonite clay (Bentone SD-2) | 0.20 |

The above components are charged into a mixing vessel, which is equipped with a Cowles mixing blade. The blade is concentrically centered in the mixing container, and the depth of the blade from the bottom of the mixing container is about one-half the blade diameter.

The sodium salt of polyacrylic acid and propylene glycol are added first, under mild agitation. The titanium dioxide and clay are then added gradually under mild agitation. When all the titanium dioxide is fully incorporated into the liquid, the agitation is increased until the blade tip speed is at least 5,500 ft/min. The agitation is continued for at least five minutes, and a measurement of dispersion quality is made, typically with a Hegman grind gauge, according to ASTM 1210-79. A Hegman reading of 7.0 or above is satisfactory.

Example II

Six pounds of Quantum MP736-16 LLDPE powder resin is charged into a Henschel Prodex mixer such that the container is 75% full. The mixer is started at its lowest speed (about 3500 ft/min tip speed), and a pump is initiated to feed the liquid colorant of Example I drop-wise into the mixer. The liquid color is fed in over about a 60 second interval so as to provide 0.029 lbs of liquid colorant in the mixer. The charge is mixed an additional two minutes to provide a temperature rise of about 105° F.

Example III

The mixture of Example II is fed into a Ferry Corp. rotational molding machine at a temperature of about 500° F. and colored plastic drums are produced.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed:

1. A method of rotationally molding a product comprising the steps of:

A. providing a liquid color system comprising from about 10% to about 75% by weight carrier, from about 0% to about 15% by weight water, from about 0.1% to about 10% by weight dispersant and from about 10% to about 80% by weight colorant, said carrier comprising one or more materials selected from the group consisting of propylene glycol, ethylene glycol, diethylene glycol, tri(ethylene glycol), and glycerin;

B. providing a polymeric resin powder;

C. mixing said liquid color system and said powder to form a mixture using a distributive mixer; and D. feeding said mixture into a rotational molding machine to produce a colored rotationally molded product.

2. A method as set forth in claim 1 wherein said liquid color system has an evaporation rate of from about 0.01 to about 0.36 based on the ASTM test procedure D3539-87 using an automatic evaporometer whereby the relative evaporation rate for n-butyl acetate is 1.0.

3. A method as set forth in claim 1 wherein said polymeric resin powder comprises a material selected from the group consisting of polyethylene, polyethylene, or a mixture thereof.

4. A method as set forth in claim 1 wherein during said step C said liquid color system is added to said powder to provide a mixture comprising from about 0.05% to about 4% by weight liquid color system.

5. A method as set forth in claim 1 wherein said colorant comprises a material selected from the group consisting of an inorganic pigment, an organic pigment, an organic dyestuff, carbon black or mixtures thereof.

6. A method as set forth in claim 1 wherein said dispersant serves to maintain the uniform dispersion of said colorant within said carrier.

7. A method as set forth in claim 1 including up to about 10% by weight of one or more additives selected from the group consisting of antimicrobials, lubricants, filler/reinforcing materials, light stabilizers, heat stabilizers, release agents, antistats, impact modifiers and mixtures thereof.

8. A method as set forth in claim 1 wherein said step D further includes the steps feeding said mixture into a rotating mold heated to a temperature of from about 350° F. to about 650° F., allowing said polymeric resin powder contained in said mixture to solidify and form the product, and removing the formed product from the mold.

9. A method as set forth in claim 1 wherein said distributive mixer comprises a mixer selected from the group consisting of a ribbon blender, a paddle blender, and a rotary blade mixer.

10. A method as set forth in claim 1 wherein said liquid color system comprises from about 15% to about 65% by weight said carrier.

11. A method as set forth in claim 1 wherein said liquid color system comprises from about 0.02% to about 8% said dispersant.

12. A method as set forth in claim 1 wherein said liquid color system comprises from about 1% to about 14% by weight said water.

* * * * *